United States Patent Office 2,770,552
Patented Nov. 13, 1956

2,770,552
PROCESS OF MAKING REFRACTORY MATERIAL

Arthur O. Pieper, Brighton, N. Y., assignor to Heany Industrial Ceramic Corporation, New Haven, Conn., a corporation of New York No Drawing. Application March 11, 1953, Serial No. 341,819

1 Claim. (Cl. 106—44)

This invention relates to a process of making refractory material such as used in supporting wares during firing at temperatures as high or higher than 3000° F., and has for its purpose to afford a refractory that withstands higher temperatures, has a longer life with considerably less susceptibility to breakage, and is in other respects superior to refractory materials heretofore available for such purposes.

Refractory supporting plates made of silicon carbide have been tried and proved unsuccessful because they do not hold up when subjected to high temperatures, while plates of alumina have also been tried and found unsuccessful owing to their short life resulting from breakage or excessive brittleness at high temperatures and, while the best results thus far obtained have been from a refractory made from alumina composed of proportions having different degrees of fineness, a particular purpose of the present invention is to afford a refractory material made from alumina which shall possess greater strength, greater resistance to breakage, longer life, and the ability to withstand higher temperatures than the alumina refractories as heretofore made or other refractory materials as previously constructed.

This invention is in the nature of an improvement on the process forming the subject matter of Langrod Patent No. 2,463,979, dated March 8, 1949, since it has been discovered that by employing a mix consisting of silicon carbide of a certain fineness and alumina consisting of certain proportions in varying degrees of fineness, a refractory is made possible which is stronger, less brittle, and less susceptible to breakage than the refractory made in accordance with the Langrod patent, and which possesses a much longer life when subjected to the highest temperatures required.

The process may be carried out sucessfully without adhering strictly to the details set forth herein and satisfactory results, which have thus far proved vastly superior to any other available refractories, have been obtained by mixing about 17.5% to 25% by weight of silicon carbide having a fineness of 46 mesh with about 75% to 82.5% by weight of alumina in proportions having various degrees of fineness, as hereinafter set forth. The alumina is made up preferably of 58% by weight having a fineness of −6+60 mesh, 32% by weight having a fineness of −60+325 mesh, and 10% by weight having a fineness of −325 mesh. By this is meant alumina that passes through a 6 mesh screen and is retained on a 60 mesh screen, alumina that passes through a 60 mesh screen and is retained on a 325 mesh screen, and alumina that passes through a 325 mesh screen.

The alumina is preferably what is known commercially as grade T-60 or alpha tabular alumina and the process can be carried out by employing 19 pounds of alumina to 4 pounds of silicon carbide, the alumina content being composed of 11 pounds having a fineness of approximately 6 mesh, 6 pounds having a fineness of approximately 60 mesh, and 2 pounds having a fineness of approximately 325 mesh.

To the silicon carbide and alumina mix is added 320 grams of a lignin derivative which burns out during firing, preferably consisting of "Marasperse C" produced by Marathon Corporation, Rothschild, Wisconsin, under Patent No. 1,948,858, dated February 27, 1934, for Lignin Derivatives and Process of Making Same. The materials are thoroughly mixed in what is known commercially as a Lancaster mixer or other suitable mixing apparatus during which mixing a small amount of water is added in the proportions of 2 oz. of water to 4 pounds of the mix of alumina, silicon carbide, and binder. After thorough mixing of the mass with water, which facilitates pressing or ramming the material into the desired shape, the articles are formed in any desired shapes and dried for approximately 5 hours at a temperature of 400° F. Following drying, the articles are fired in a suitable furnace from a starting room temperature to 3000° F. over a period of 16 hours, and the refractory material produced in this fashion has proved much stronger and possesses longer life than any refractory materials heretofore employed or available. Plates made of this material have been used over a longer period of time and through many more furnace runs before breaking than any refractory plates heretofore used or tested, and refractory articles made according to the present process have possessed a high degree of resistance to breakage and have proved satisfactory over a long period of time when subjected to temperatures at 3000° F. or 1660° C. plus.

While the invention has been described with reference to certain details as to amounts, degrees of fineness, and temperatures, it is not confined to the exact procedure set forth and this application is intended to cover such departures or modifications as may come within the purposes of the improvement or the scope of the following claim.

I claim:

The process of making refractory material which consists in mixing about 17.5% to 25% by weight of silicon carbide having a fineness of 46 mesh with about 75% to 82.5% by weight of alumina, said volume of alumina being made up of 58% by weight having a fineness of −6+60 mesh, 32% by weight having a fineness of −60+325 mesh, and 10% by weight having a fineness of −325 mesh, adding to said mix 320 grams of a lignin derivative and water in the proportions of 2 oz. of water to 4 pounds of the alumina, silicon carbide and lignin derivative mix, and thereafter forming, drying for five hours at a temperature of 400° F., and firing the material from room temperature to 3000° F. over a period of 16 hours.

References Cited in the file of this patent

UNITED STATES PATENTS

| Number | Name | Date |
|---|---|---|
| 2,004,594 | Benner et al. | June 11, 1935 |
| 2,040,236 | Benner et al. | May 12, 1936 |
| 2,087,066 | Nadler | July 13, 1937 |
| 2,388,080 | Riddle | Oct. 30, 1945 |
| 2,531,397 | Caton | Nov. 28, 1950 |
| 2,589,157 | Stalhane | Mar. 11, 1952 |